(12) United States Patent
Hou et al.

(10) Patent No.: US 11,447,419 B2
(45) Date of Patent: Sep. 20, 2022

(54) LIGHTWEIGHT AGGREGATE ULTRA-HIGH PERFORMANCE CONCRETE (UHPC) AND PREPARATION METHOD THEREOF

(71) Applicant: QINGDAO UNIVERSITY OF TECHNOLOGY, Shandong (CN)

(72) Inventors: Dongshuai Hou, Shandong (CN); Xinpeng Wang, Shandong (CN); Mengmeng Li, Shandong (CN); Qihui Geng, Shandong (CN); Pan Wang, Shandong (CN); Bing Yin, Shandong (CN); Yue Zhang, Shandong (CN)

(73) Assignee: Qingdao University of Technology, Qingdao (CN)

( * ) Notice: Subject to any disclaimer, the term of this patent is extended or adjusted under 35 U.S.C. 154(b) by 45 days.

(21) Appl. No.: 17/053,424

(22) PCT Filed: Dec. 30, 2019

(86) PCT No.: PCT/CN2019/129993
§ 371 (c)(1),
(2) Date: Nov. 6, 2020

(87) PCT Pub. No.: WO2021/134236
PCT Pub. Date: Jul. 8, 2021

(65) Prior Publication Data
US 2022/0112131 A1    Apr. 14, 2022

(51) Int. Cl.
| | | |
|---|---|---|
| *C04B 28/04* | (2006.01) | |
| *C04B 14/18* | (2006.01) | |
| *C04B 14/48* | (2006.01) | |
| *C04B 18/14* | (2006.01) | |
| *C04B 20/00* | (2006.01) | |
| *C04B 24/26* | (2006.01) | |
| *C04B 40/00* | (2006.01) | |
| *C04B 40/02* | (2006.01) | |
| *C04B 103/30* | (2006.01) | |
| *C04B 103/32* | (2006.01) | |

(52) U.S. Cl.
CPC ............ *C04B 28/04* (2013.01); *C04B 14/185* (2013.01); *C04B 14/48* (2013.01); *C04B 18/146* (2013.01); *C04B 20/0036* (2013.01); *C04B 24/2641* (2013.01); *C04B 40/0046* (2013.01); *C04B 40/0263* (2013.01); *C04B 40/0277* (2013.01); *C04B 2103/302* (2013.01); *C04B 2103/32* (2013.01)

(58) Field of Classification Search
CPC ..... C04B 14/48; C04B 14/185; C04B 18/146; C04B 20/0036; C04B 24/2641; C04B 28/04; C04B 40/0046; C04B 40/0263; C04B 40/0277; C04B 2103/32; C04B 2103/302; C04B 14/18; C04B 28/02
See application file for complete search history.

(56) References Cited

U.S. PATENT DOCUMENTS

| | | | | |
|---|---|---|---|---|
| 5,114,617 A | * | 5/1992 | Smetana | ................. C04B 28/04 |
| | | | | 106/DIG. 2 |
| 10,308,553 B2 | | 6/2019 | Maslehuddin et al. | |
| 10,457,603 B2 | | 10/2019 | Maslehuddin et al. | |
| 2019/0169070 A1 | | 6/2019 | Maslehuddin et al. | |

FOREIGN PATENT DOCUMENTS

| | | | |
|---|---|---|---|
| CN | 103896527 A | | 7/2014 |
| CN | 105084840 A | | 11/2015 |
| CN | 105272004 A | | 1/2016 |
| CN | 106396546 A | | 2/2017 |
| CN | 107760077 A | * | 3/2018 |
| CN | 109400076 A | | 3/2019 |

OTHER PUBLICATIONS

PCT/CN2019/129993 International Search Report dated Aug. 12, 2020.
CN103896527A—English machine translation of Abstract.
CN105084840A—English machine translation of Abstract.
CN105272004A—English machine translation of Abstract.
CN109400076A—English machine translation of Abstract.
CN106396546A—English machine translation of Abstract.

* cited by examiner

*Primary Examiner* — Anthony J Green
(74) *Attorney, Agent, or Firm* — Patrick M. Torre; Stites & Harbison, PLLC

(57) ABSTRACT

The disclosure relates to the technical field of building materials, and in particular, to lightweight aggregate ultra-high performance concrete (UHPC) and a preparation method thereof. The lightweight aggregate UHPC provided in the disclosure is prepared from the following components in parts by weight: cement 220-260 parts; silica fume 100-120 parts; expanded perlite powder 120-160 parts; expanded perlite 230-260 parts; polycarboxylate superplasticizer 15-20 parts; steel fiber 76-93 parts; and water 140-160 parts, where a maximum particle size of the expanded perlite powder is 0.075 mm; and a particle size range of the expanded perlite is 0.075-0.6 mm. The lightweight UHPC prepared according to the design of the disclosure has excellent density performance, and can satisfy requirements of concrete components, etc. in service in super-long-span bridges, super high-rise buildings, and complex marine environments for lightweight, ultra-high strength, and ultra-high durability of cement-based materials, and has a relatively high promotion value.

20 Claims, 3 Drawing Sheets

LIGHTWEIGHT AGGREGATE ULTRA-HIGH PERFORMANCE CONCRETE (UHPC) AND PREPARATION METHOD THEREOF

This application is the national stage of international patent application no. PCT/CN2019/129993 filed on Dec. 30, 2019, the entirety of the contents of which is incorporated by reference herein.

TECHNICAL FIELD

The disclosure relates to the technical field of building materials, and in particular, to lightweight aggregate ultra-high performance concrete (UHPC) and a preparation method thereof.

BACKGROUND

Lightweight aggregate concrete (LAC) is a type of concrete with apparent density less than 1950 kg/m$^3$ and is usually generated by the inclusion of lightweight aggregate. The LAC has advantages of high specific strength, heat preservation, and heat insulation, etc. Up to now, LAC has been widely applied to various structures. Compared with conventional sand and gravel aggregates, the mechanical properties of lightweight aggregates are lower. Therefore the LAC has disadvantages of low strength and poor durability, limiting its application.

Extensive studies have been conducted in improving the mechanical properties, as well as durability of LAC. Previous studies include as follows: (1) A lightweight aggregate with low water absorption, high strength, and high quality is used, but this increases raw material costs of LAC. (2) A layer of dense shell is prefabricated on the surface of a lightweight aggregate by using a cement-based material, so as to improve the strength of the lightweight aggregate. (3) An auxiliary cementing material is added to improve the performance of an interfacial transition zone between a lightweight aggregate and cement mortar (the interfacial transition zone serves as a shell of the lightweight aggregate), thereby improving the performance of LAC.

However, the above technical methods have put forward higher requirements for both the pretreatment process and the construction process of the lightweight aggregate. In addition, the preparation process is complex, and deficiencies in the preparation of LAC are not fundamentally overcome. As a result, the performance improvement of the LAC is limited.

SUMMARY

A purpose of the disclosure is to provide new ideas in developing LAC with enhanced performance. In the disclosure, expanded perlite with wide sources is used as a lightweight aggregate (filler), and the lightweight aggregate UHPC with ultra-high strength, high toughness, high impact resistance, and excellent durability is prepared by improving slurry homogeneity and reducing stress concentration of the concrete. In this study, on one hand, the widely available lightweight aggregate is used, to reduce the costs of the lightweight aggregate and simplify its pretreatment process; on the other hand, compared with the existing study of LAC, the LAC prepared in this study shows more excellent performance.

To achieve the above purpose, the disclosure provides the following technical solutions.

The disclosure provides lightweight aggregate ultra-high performance concrete (UHPC), prepared from the following components in parts by weight:

| | |
|---|---|
| cement | 220-400 parts; |
| silica fume | 100-120 parts; |
| expanded perlite powder | 5-150 parts; |
| expanded perlite | 230-260 parts; |
| water | 140-160 parts; |
| water-reducing agent | 15-20 parts; and |
| steel fiber | 76-93 parts; | where a particle size range of the expanded perlite is 0.075-0.6 mm; and
a particle size of the expanded perlite powder is less than 0.075 mm.

Preferably, the cement is Portland cement, pozzolana cement, fly ash cement, or slag cement, and an average particle size of the cement is 10.6 μm.

Preferably, the water-reducing agent is polycarboxylate superplasticizer, and a water-reducing rate of the water-reducing agent exceeds 35%.

Preferably, the steel fiber is a long-straight steel fiber, a diameter of the steel fiber is 0.1-0.3 mm, a length of the steel fiber is 6-15 mm, and tensile strength of the steel fiber is higher than 1600 MPa.

Preferably, a design method for determining a formula of the lightweight aggregate UHPC includes the following steps:
(1) designing a mix proportion of base groups with a dense structure based on a close packing theory by using a Modified Andreasen and Andersen model;
(2) establishing functional relationships between amounts of the expanded perlite powder and the expanded perlite for replacement and ultra-high performance, namely, density and strength, according to the response surface methodology, and determining mixing amounts of the expanded perlite powder and the expanded perlite according to a performance requirement; and
(3) testing and verifying the mix proportion designed according to the response surface methodology, to obtain a mix proportion of the lightweight aggregate UHPC.

Preferably, the expanded perlite powder is used to replace a part of the cement, and the expanded perlite is used to replace a part or all of quartz sand.

Preferably, the formula of the lightweight aggregate UHPC in step (3) is as follows:
when density of the lightweight aggregate UHPC is at a level 1700, the lightweight aggregate UHPC is prepared from the following components in parts by weight: 241 parts of the cement, 112 parts of the silica fume, 147 parts of the expanded perlite powder, and 244 parts of the expanded perlite, 146 parts of the water, 18 parts of the water-reducing agent, and 93 parts of the steel fiber; and
when the density of the lightweight aggregate UHPC is at a level 1800, the lightweight aggregate UHPC is prepared from the following components in parts by weight: 388 parts of the cement, 102 parts of the silica fume, 47 parts of the expanded perlite powder, and 223 parts of the expanded perlite, 137 parts of the water, 16 parts of the water-reducing agent, and 85 parts of the steel fiber.

The disclosure further provides a preparation method of the lightweight aggregate ultra-high performance concrete (UHPC) of the above technical solution, including the following steps:

(1) conducting first mixing on the cement, the silica fume, the expanded perlite powder, and the expanded perlite to obtain a mixture;

(2) conducting second mixing on the mixture, the water-reducing agent, and the water to obtain mixed slurry;

(3) conducting third mixing on the mixed slurry and the steel fiber to obtain a blank; and (4) conducting heat curing to obtain the lightweight UHPC.

Preferably, the heat curing includes first-stage hot water curing and second-stage high-temperature dry curing that are conducted in sequence.

Preferably, the first-stage hot water curing includes pre-curing, a heating stage, a constant-temperature stage, and a cooling stage that are conducted in sequence, where the pre-curing temperature is 20-40° C. and the pre-curing time is 12-36 h in the first-stage hot water curing;

a heating rate in the heating stage of the first-stage hot water curing is 0.1-1° C./min;

the temperature is 90-100° C. and the constant-temperature time is 6-8 h in the constant-temperature stage of the first-stage hot water curing; and a cooling rate in the cooling stage of the first-stage hot water curing is 0.23-0.3° C./min; and the second-stage high-temperature dry curing includes a heating stage, a constant-temperature stage, and a cooling stage that are conducted in sequence, where a heating rate in the heating stage of the second-stage high-temperature dry curing is 5-10° C./min;

the constant-temperature time in the constant-temperature stage of the second-stage high-temperature dry curing is 2-3 h; and a cooling rate in the cooling stage of the second-stage high-temperature dry curing is 0.1-0.5° C./min.

The disclosure provides lightweight aggregate UHPC, which is prepared from the following components in parts by weight: cement 220-260 parts; silica fume 100-120 parts; expanded perlite powder 120-160 parts; expanded perlite 230-260 parts; polycarboxylate superplasticizer 15-20 parts; steel fiber 76-93 parts; and water 140-160 parts. A particle size of the expanded perlite powder is less than 0.075 mm, and a particle size of the expanded perlite is 0.075-0.6 mm. In the disclosure, the expanded perlite with wide sources and relatively low performance is used as a lightweight aggregate component, and the expanded perlite and the expanded perlite powder are uniformly dispersed in the concrete through control of particle sizes and dosages of the expanded perlite and the expanded perlite powder and the coordination of other raw materials, so as to construct a stress-dispersed geometric structure; and the steel fiber further is added to further avoid stress concentration, to obtain the lightweight aggregate UHPC with ultra-high strength, high toughness, high impact resistance, and excellent durability. Compared with the prior art, in the disclosure, the enhancement of a lightweight aggregate (a conventional lightweight aggregate such as ceramsite) is not considered, and therefore there is no need to use a high-strength lightweight aggregate; but the homogeneity of a cement-based material is improved to reduce stress concentration, so as to obtain the cement-based material with both low density and high strength. The raw materials for preparing the lightweight aggregate UHPC provided in the disclosure are widely available, and the expanded perlite as a lightweight aggregate has low costs and is easy to treat. The lightweight UHPC prepared according to the design of the disclosure has excellent density performance (density is less than 1700 kg/m$^3$, compressive strength is greater than 150 MPa, a 28-day electric flux is less than 100 C), and can satisfy requirements of concrete components, etc. in service in super-long-span bridges, super high-rise buildings, and complex marine environments for lightweight, ultra-high strength, and ultra-high durability of cement-based materials, and has a relatively high promotion value.

The disclosure further provides a preparation method of the foregoing lightweight aggregate UHPC. In the disclosure, there is no need to use other processes to pretreat the lightweight aggregate and other raw materials, thereby simplifying the preparation process and shortening a production cycle.

DETAILED DESCRIPTION

Figure 1:
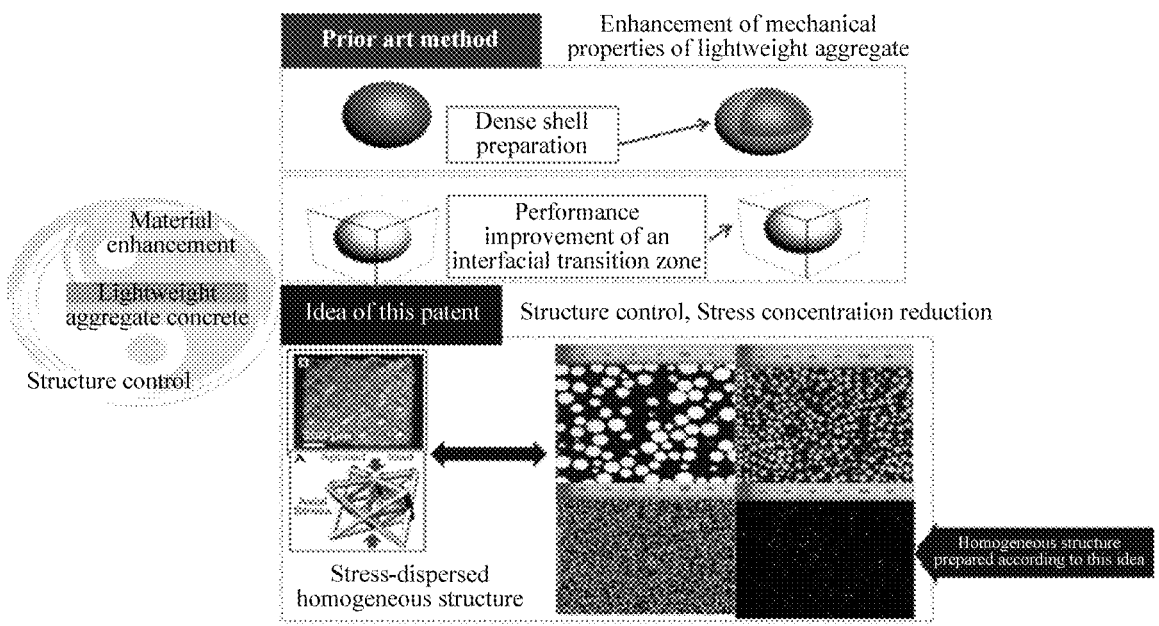
FIG. 1 is a design flowchart of lightweight aggregate UHPC according to the disclosure.

The disclosure is further described below with reference to the accompanying drawings and examples.

The disclosure provides lightweight aggregate UHPC, which is prepared from the following components in parts by weight:

| | |
|---|---|
| cement | 220-400 parts; |
| silica fume | 100-120 parts; |
| expanded perlite powder | 5-150 parts; |
| expanded perlite | 230-260 parts; |
| water | 140-160 parts; |
| water-reducing agent | 15-20 parts; and |
| steel fiber | 76-93 parts. |

A particle size of the expanded perlite is 0.075-0.6 mm.

A particle size of the expanded perlite powder is less than 0.075 mm.

In the disclosure, unless otherwise specified, all the raw material components are commercially available products well known to a person skilled in the art.

In the disclosure, based on weight parts, the raw materials for preparing the lightweight aggregate UHPC include 220-260 parts of the cement and preferably include 240 parts of the cement. In the disclosure, the cement is preferably Portland cement, pozzolan cement, flyash cement, or slag cement, and is more preferably ordinary Portland cement; and an average particle size of the cement is preferably 10.6

μm. In the disclosure, the cement has both a function of participating in a hydration reaction and a physical filling function.

In the disclosure, based on the weight parts of the cement, the raw materials for preparing the lightweight aggregate UHPC include 100-120 parts of the silica fume and preferably include 112 parts of the silica fume. In the disclosure, the silica fume has a function of exerting a pozzuolanic effect and a filling function.

In the disclosure, based on the weight parts of the cement, the raw materials for preparing the lightweight aggregate UHPC include 120-160 parts of the expanded perlite powder and more preferably include 147 parts of the expanded perlite powder, and the particle size of the expanded perlite powder is preferably less than 0.075 mm. In the disclosure, a preparation method of the expanded perlite powder preferably includes: conducting ball milling on commercially available expanded perlite, and conducting sieving to obtain the expanded perlite powder with a particle size less than 0.075 mm. In the disclosure, a rotation speed of the ball milling is preferably 30-40 r/min, and the ball milling time is preferably 0.3-1.0 h.

In the disclosure, based on the weight parts of the cement, the raw materials for preparing the lightweight aggregate UHPC include 230-260 parts of the expanded perlite and preferably include 244 parts of the expanded perlite, and the particle size of the expanded perlite is preferably 0.075-0.6 mm. In the disclosure, a preparation method of the expanded perlite preferably includes: conducting ball milling on commercially available expanded perlite, and conducting sieving to obtain the expanded perlite with a particle size of 0.075-0.6 mm. In the disclosure, a rotation speed of the ball milling is preferably 30-40 r/min, and the ball milling time is preferably 0.1-0.3 h.

In the disclosure, based on the weight parts of the cement, the raw materials for preparing the lightweight aggregate UHPC include 15-20 parts of the water-reducing agent and preferably include 18 parts of the water-reducing agent. In the disclosure, the water-reducing agent is preferably a polycarboxylate water-reducing agent, the solid content of the water-reducing agent is preferably 18%, and a water-reducing rate of the water-reducing agent exceeds 35%.

In the disclosure, based on the weight parts of the cement, the raw materials for preparing the lightweight aggregate UHPC include 76-93 parts of the steel fiber and preferably include 93 parts of the steel fiber. In the disclosure, the steel fiber is preferably a long-straight steel fiber, a diameter of the steel fiber is preferably 0.1-0.3 mm and more preferably 0.2 mm; a length of the steel fiber is preferably 6-15 mm and more preferably 13 mm; and tensile strength of the steel fiber is preferably higher than 1600 MPa and more preferably 2400 MPa.

In the disclosure, a design method for determining a formula of the lightweight aggregate UHPC includes the following steps:

(1) designing a mix proportion of base groups with a dense structure based on a close packing theory by using a Modified Andreasen and Andersen model;

(2) establishing functional relationships between amounts of the expanded perlite powder and the expanded perlite for replacement and ultra-high performance, namely, density and strength, according to the response surface methodology, and determining mixing amounts of the expanded perlite powder and the expanded perlite according to a performance requirement; and (3) testing and verifying the mix proportion designed according to the response surface methodology, to obtain a mix proportion of the lightweight aggregate UHPC.

A design idea of the lightweight aggregate UHPC of the disclosure is shown in FIG. 1. The disclosure aims to establish a homogeneous structure for preventing stress concentration rather than to prepare UHPC by improving the strength of a lightweight aggregate.

Figure 2:
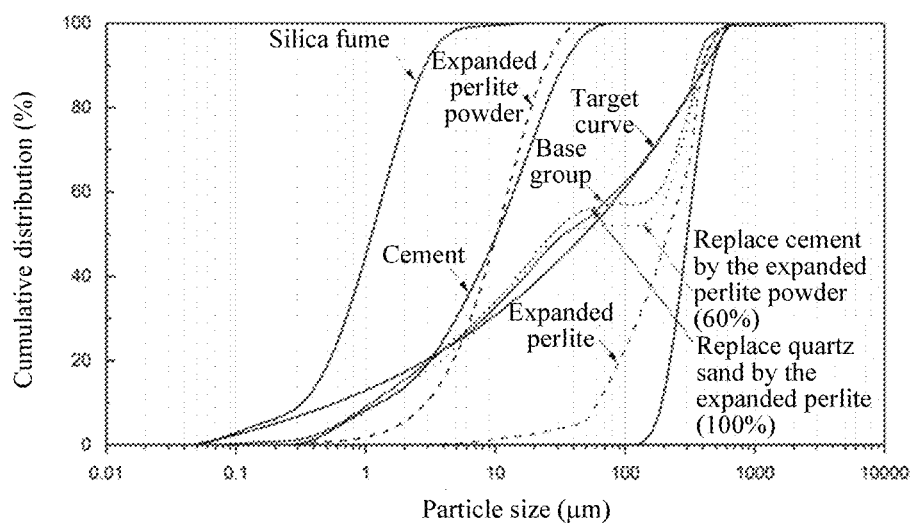
FIG. 2 is a relationship diagram of replacement of other raw materials by expanded perlite and expanded perlite powder.

In the disclosure, preferably, particle size ranges of an expanded perlite powder filler and a lightweight aggregate expanded perlite are adjusted according to a particle close packing theory by using a Modified Andreasen and Andersen model, to establish an appropriate replacement relationship (that is, the expanded perlite powder is used to replace cement, and the expanded perlite is used to replace quartz sand, to ensure close packing density). A specific process includes first preparing expanded perlite with a particle size of 0.075-0.6 mm and expanded perlite powder with a particle size less than 0.075 mm; and then preliminarily establishing a relationship of replacement of other preparation raw materials by the expanded perlite and the expanded perlite powder according to the particle close packing theory by using the Modified Andreasen and Andersen model. As shown in FIG. 2, it can be seen from FIG. 2 that close packing density of the system is little affected when the expanded perlite powder and the expanded perlite are used to respectively replace cement and quartz sand. Therefore, it is determined that the expanded perlite powder is used to replace a part of cement, and the expanded perlite is used to replace a part or all of quartz sand. A mix proportion of base groups is shown in Table 1.

TABLE 1

| Mix proportion (kg/m³) of the base groups | | | | | |
|---|---|---|---|---|---|
| No. | Silica fume | Cement | Quartz sand | Water | Water-reducing agent | Steel fiber |
| Ref.+ | 188 | 880 | 990 | 200 | 10 | 156 |

After the relationship of replacement of other preparation raw materials by the expanded perlite and the expanded perlite powder is determined, amounts of the light filler expanded perlite powder and the lightweight aggregate expanded perlite for replacement are further determined according to the response surface methodology in the disclosure. A specific process includes the following steps.

(1) Determine the independent variables, a value range of the independent variables, and dependent variables: In the disclosure, the amounts of the light filler expanded perlite powder and the lightweight aggregate expanded perlite for replacement are independent variables, and density (calculated as absolute dry density) and the compressive strength of a cement-based material are dependent variables. For the independent variables, constraint conditions, and the dependent variables, refer to Table 2.

TABLE 2

Independent variables (including constraint conditions) and dependent variables

| Independent variable | | Constraint condition | | Dependent variable | |
|---|---|---|---|---|---|
| Actual variable | Coding (Standardized coding) | Minimum value | Maximum value | Actual value | Coding |
| Amount (Vol. %) of the expanded perlite powder for replacing cement | $X_1(A)$ | 0 | 60 | Density (kg/m³) | $y_1$ |
| Amount (Vol. %) of the expanded perlite for replacing quartz sand | $X_2(B)$ | 0 | 100 | Strength (MPa) | $y_2$ |

Figure 3:
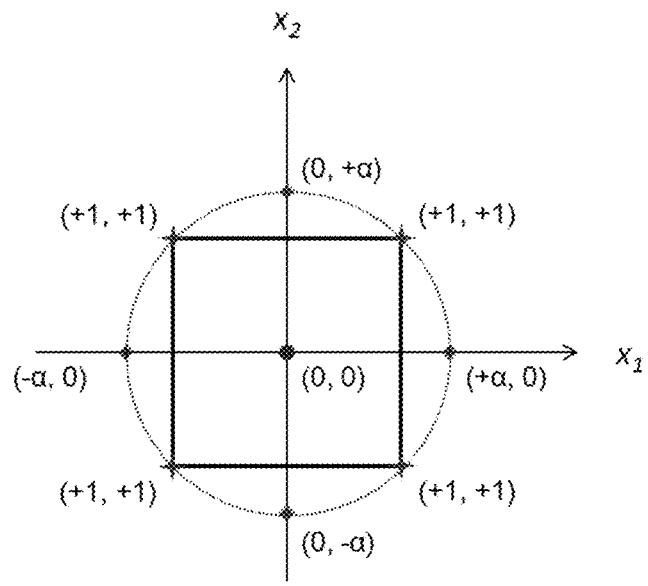
FIG. 3 is a diagram of determining test points of a test scheme by using the response surface methodology.

(2) Design a test and record results: The response surface methodology (CCD method) is used to determine a test scheme (refer to FIG. 3) (the test is repeated at a center point for 3 times), a total of 11 mix proportions are used for the test, and test data is recorded. The test scheme and the test results are shown in Table 3.

TABLE 3

Test scheme (kg/m³) and results

| | | | | Test scheme (kg/m³) | | | | | | Test results | |
|---|---|---|---|---|---|---|---|---|---|---|---|
| No | | Silica fume | Cement | Perlite powder | Quartz sand | Perlite | Water | Water-reducing agent | Steel fiber | Density | Strength |
| 1 | ◆ | 188 | 430 | 235 | 845 | 60 | 198 | 30 | 156 | 2170 | 158.9 |
| 2 | | 188 | 430 | 235 | 144 | 350 | 239 | 30 | 156 | 1760 | 123.9 |
| 3 | | 188 | 803 | 40 | 145 | 350 | 242 | 30 | 156 | 1870 | 143.7 |
| 4 | | 188 | 803 | 40 | 845 | 60 | 200 | 30 | 156 | 2310 | 181.0 |
| 5 | + | 188 | 352 | 276 | 495 | 205 | 218 | 30 | 156 | 1950 | 133.0 |
| 6 | | 188 | 880 | 0 | 495 | 205 | 220 | 30 | 156 | 2110 | 162.0 |
| 7 | | 188 | 616 | 138 | 0 | 410 | 250 | 30 | 156 | 1720 | 139.2 |
| 8 | | 188 | 616 | 138 | 990 | 0 | 190 | 30 | 156 | 2340 | 183.1 |
| 9 | ● | 188 | 616 | 138 | 495 | 205 | 220 | 30 | 156 | 2050 | 154.6 |
| 10 | | 188 | 616 | 138 | 495 | 205 | 220 | 30 | 156 | 2030 | 153.0 |
| 11 | | 188 | 616 | 138 | 495 | 205 | 220 | 30 | 156 | 2070 | 157.9 |

(3) Establish a model and evaluate the accuracy of the model, refer to Table 4. Based on the test results, a regression model is fitted to obtain the following relationships between a mixing amount of a lightweight aggregate (filler) and density of a cement-based material and between the mixing amount of the lightweight aggregate (filler) and the strength of the cement-based material:

Density=2424.00−280.65×amount of the expanded perlite powder for replacing cement−610.52×amount of the expanded perlite for replacing quartz sand; and Strength=190.55659+6.77904×amount of the expanded perlite powder for replacing cement−68.73060×amount of the expanded perlite for replacing quartz sand+7.33333×amount of the expanded perlite powder for replacing cement×amount of the expanded perlite for replacing quartz sand−98.93519×amount of the expanded perlite powder for replacing cement×amount of the expanded perlite powder for replacing cement+18.98333×amount of the expanded perlite for replacing quartz sand×amount of the expanded perlite for replacing quartz sand.

TABLE 4

Model accuracy evaluation results

| Response | Adj-$R^2$ | Pre-$R^2$ | F-value | Lack of fit | Model p-value |
|---|---|---|---|---|---|
| $y_1$ | 0.9977 | 0.9972 | 2160.17 | 0.50 | <0.0001 |
| $y_2$ | 0.9502 | 0.9152 | 96.39 | 8.45 | <0.0001 |

The F values of the model are 2160.17 and 96.39, respectively, and the P values of the model are less than 0.0001, indicating that the model is extremely significant. The adjusted determination coefficients Adj-$R^2$ of the model are 0.99 and 0.95, respectively. The multiple correlation coefficients Pre-$R^2$ of the model are 0.99 and 0.91, indicating that the model has a high degree of model fitting. The results show that this model has good reliability and high analysis credibility.

(4) Set a range and conduct solving. For different LAC designed in the disclosure, refer to Table 5.

TABLE 5

Solving conditions (kg/m³)

| Independent and dependent variables | Value range | | Purpose |
|---|---|---|---|
| $X_1(A)$ | 0 | 0.60 | Value in the range |
| $X_2(B)$ | 0 | 1.00 | Value in the range |
| $y_1$ | 1500 | 2500 | Minimum value |
| $y_2$ | 120 | 200 | Value in the range |

According to the functional relationship and the preset target performance, the formula of the lightweight aggregate UHPC is obtained, and is specifically shown in Table 6.

TABLE 6

The formula (kg/m³) of the lightweight aggregate UHPC

| | Silica fume | Cement | Expanded perlite powder | Expanded perlite | Water | Water-reducing agent | Steel fiber |
|---|---|---|---|---|---|---|---|
| Level-1700 UHPC | 188 | 405 | 248 | 410 | 246 | 30 | 156 |
| Level-1800 UHPC | 188 | 713 | 87 | 410 | 252 | 30 | 156 |

The disclosure further provides a preparation method of the lightweight aggregate UHPC in the above technical solution, including the following steps:

(1) conducting first mixing on the cement, the silica fume, the expanded perlite powder, and the expanded perlite to obtain a mixture;

(2) conducting second mixing on the mixture, the water-reducing agent, and the water to obtain mixed slurry;

(3) conducting third mixing on the mixed slurry and the steel fiber to obtain a blank; and (4) conducting heat curing on the blank to obtain the lightweight aggregate UHPC.

In the disclosure, first mixing is conducted on the cement, the silica fume, the expanded perlite powder, the expanded perlite, and quartz sand to obtain a mixture. In the disclosure, the first mixing is preferably conducted in a stirring condition, and a stirring speed is preferably 135-145 r/min; and the stirring time is preferably 2-5 min and more preferably 3 min. In the disclosure, the addition of the expanded perlite and the expanded perlite powder can significantly increase the friction between the mixture and an inner wall of a mixer, and increase the friction and shear force between mortar mixtures. The relatively large force and shear force help to increase dispersion speeds of the water and the water-reducing agent, so that the concrete can be mixed to form uniform slurry.

In the disclosure, after the mixture is obtained, second mixing is conducted on the mixture, the water-reducing agent, and the water to obtain the mixed slurry. In the disclosure, preferably, the water and the water-reducing agent are mixed first, and then the obtained mixture is mixed with the mixture mentioned above.

In the disclosure, after the mixed slurry is obtained, third mixing is conducted on the mixed slurry and the steel fiber, and blank preparation is conducted to obtain the blank. In the disclosure, after the mixed slurry is obtained, preferably, the mixed slurry is stirred at a high speed first, and then the steel fiber is added for mixing. In the disclosure, a stirring speed of the high-speed stirring is preferably 270-290 r/min, and the stirring time is preferably 2 min. In the disclosure, the homogeneity of the mixed slurry is improved through high-speed stirring.

In the disclosure, the third mixing is preferably conducted in a stirring condition, and a stirring speed is preferably 135-145 r/min; and the stirring time is preferably 2-3 min and more preferably 2 min. The final addition of the steel fiber in the disclosure can improve the dispersion uniformity of various materials in the concrete.

The preparation process is not specifically limited in the disclosure, provided that a preparation process of UHPC well known in the art is adopted.

In the disclosure, after a sample is obtained, heat curing is conducted on the sample to obtain the lightweight aggregate UHPC. In the disclosure, the heat curing preferably includes first-stage hot water curing and second-stage high-temperature dry curing that are conducted in sequence.

The first-stage hot water curing preferably includes pre-curing, a heating stage, a constant-temperature stage, and a cooling stage that are conducted in sequence. The pre-curing temperature is preferably 20-40° C. and the pre-curing time is preferably 12-36 h. A rate in the heating stage is preferably 0.1-1° C./min. The temperature is preferably 90-100° C. and the constant-temperature time is preferably 6-8 h in the constant-temperature stage. A cooling rate in the cooling stage is preferably 0.23-0.3° C./min.

The second-stage high-temperature dry curing preferably includes a heating stage, a constant-temperature stage, and a cooling stage that are conducted in sequence. A heating rate in the heating stage is preferably 5-10° C./min. In a specific embodiment of the disclosure, preferably, the constant temperature is kept for 2-3 h each time there is a temperature rise of 50° C. In the disclosure, the temperature in the constant-temperature stage is preferably 250° C., and the constant-temperature time is preferably 2-3 h. A cooling rate in the cooling stage is preferably 0.1-0.5° C./min.

The following clearly and completely describes the technical solutions in the disclosure with reference to examples in the disclosure. Apparently, the described examples are merely a part rather than all of the examples of the disclosure. All other examples obtained by persons of ordinary skill in the art based on the examples in the disclosure without creative efforts shall fall within the protection scope of the disclosure.

Example 1

(1) 405 kg of P.O 42.5R ordinary Portland cement (with an average particle size of 10.6 μm), 188 kg of silica fume (with an average particle size of 0.9 μm), 248 kg of expanded perlite powder (with a particle size of 0-0.075 mm), and 410 kg of expanded perlite (with a particle size of 0.075-0.6 mm) were stirred for 3 min at 140 r/min to obtain a mixture.

(2) 30 kg of polycarboxylate superplasticizer (with solid content of 18%) and 246 kg of water were added to the mixture, slowly added to the mixture in step (1), and stirred at 140 r/min for more than 5 min to obtain mixed slurry.

(3) The mixed slurry was stirred at 280 r/min for 2 min, then long-straight steel fibers (with a diameter of 0.2 mm, a length of 13 mm, and tensile strength of 2400 MPa) were added and stirred at 140 r/min for 2 min.

Figure 4:
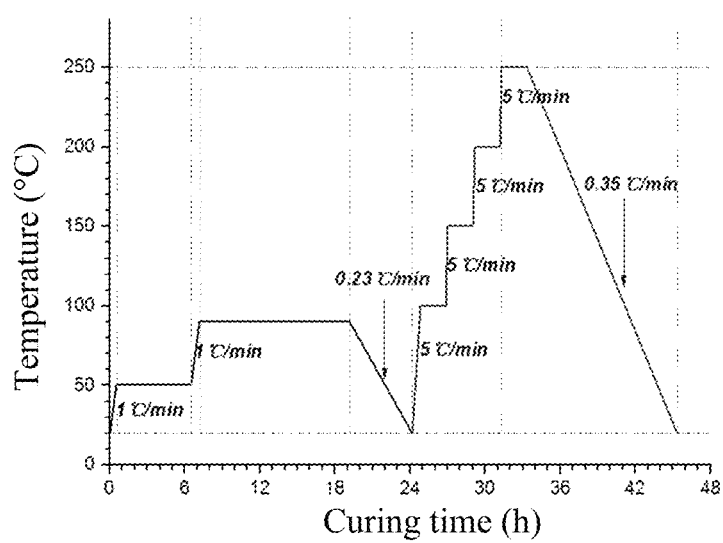
FIG. 4 is a schematic diagram of a heat curing system.

(4) After forming and demolding, the specimens were subject to heat curing according to a curing system shown in FIG. 4, to obtain lightweight aggregate UHPC. The heat curing specifically includes: first conducting pre-curing at 20° C. for 24 h; then heating to 90° C. at a heating rate of 1° C./min, and holding the temperature for 6 h; and cooling to 20° C. at a cooling rate of 0.23° C./min, then heating to 250° C. at a heating rate of 5° C./min (the constant temperature is kept for 2 h each time there is a temperature rise of 50° C.), and finally cooling to room temperature at a cooling rate of 0.35° C./min for testing.

The obtained lightweight aggregate UHPC is level-1600 UHPC and has density of 1580 kg/m³ and compressive strength of 164.9 MPa.

Test Example

Figure 5:
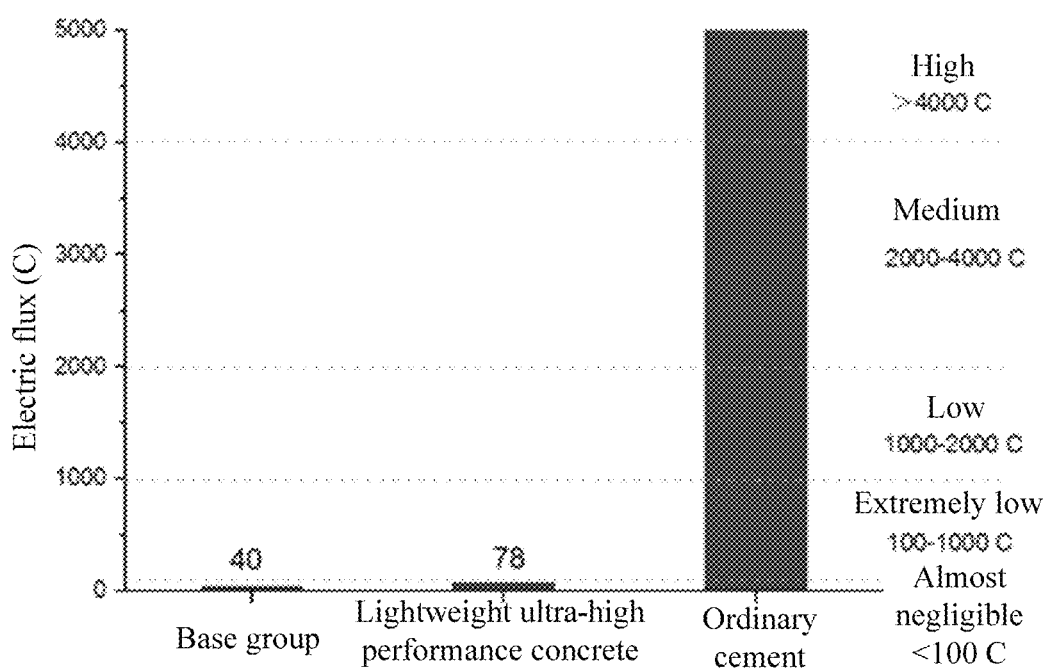
FIG. 5 is an electrical flux of lightweight aggregate UHPC prepared in Example 1.

The durability (calculated as an electric flux and a chloride ion diffusion depth) of the lightweight aggregate UHPC prepared in Example 1 was tested. Results are shown in FIG. 5. It can be seen from FIG. 5 that the lightweight aggregate UHPC prepared in the disclosure has a chloride ion penetration depth of 0 mm and an electric flux less than 100 C after 28 days of conventional curing. This indicates that the lightweight aggregate UHPC also has excellent durability in addition to advantages of lightweight and ultra-high strength.

The above description of the examples is merely intended to help understand the method and core idea of the disclosure. It should be noted that, several improvements and modifications may be made by persons of ordinary skill in the art without departing from the principle of the disclosure, and these improvements and modifications should also fall within the protection scope of the disclosure. Various modifications to these examples are readily apparent to persons skilled in the art, and the generic principles defined herein may be practiced in other examples without departing from the spirit or scope of the disclosure. Therefore, the disclosure is not limited to the examples described herein but falls within the widest scope consistent with the principles and novel features disclosed in this specification.

What is claimed is:

1. Lightweight aggregate ultra-high performance concrete (UHPC), prepared from the following components in parts by weight:

| | |
|---|---|
| cement | 220-400 parts; |
| silica fume | 100-120 parts; |
| expanded perlite powder | 5-150 parts; |
| expanded perlite | 230-260 parts; |
| water | 140-160 parts; |
| water-reducing agent | 15-20 parts; and |
| steel fiber | 76-93 parts; wherein | a particle size of the expanded perlite powder is less than 0.075 mm; and a particle size range of the expanded perlite is 0.075-0.6 mm.

2. The lightweight aggregate UHPC according to claim 1, wherein the cement is Portland cement, pozzolana cement, flyash cement, or slag cement, and an average particle size of the cement is 10.6 μm.

3. The lightweight aggregate UHPC according to claim 1, wherein the water-reducing agent is polycarboxylate superplasticizer, and a water-reducing rate of the water-reducing agent exceeds 35%.

4. The lightweight aggregate UHPC according to claim 1, wherein the steel fiber is a long-straight steel fiber, a diameter of the steel fiber is 0.1-0.3 mm, a length of the steel fiber is 6-15 mm, and tensile strength of the steel fiber is higher than 1600 MPa.

5. The lightweight aggregate UHPC according to claim 1, wherein a design method for determining a formula of the lightweight aggregate UHPC comprises the following steps:

(1) designing a first mix proportion of base groups with a dense structure based on a close packing theory by using a Modified Andreasen and Andersen model;

(2) establishing functional relationships between amounts of the expanded perlite powder and the expanded perlite for replacement and ultra-high performance, namely, density and strength, according to a response surface methodology, and determining mixing amounts of the expanded perlite powder and the expanded perlite according to a performance requirement; and (3) testing and verifying a second mix proportion designed according to the response surface methodology of (2), to obtain a mix proportion of the lightweight aggregate UHPC.

6. The lightweight aggregate UHPC according to claim 5, wherein the expanded perlite powder is used to replace a part of the cement, and the expanded perlite is used to replace a part or all of quartz sand.

7. The lightweight aggregate UHPC according to claim 5, wherein the formula of the lightweight aggregate UHPC in step (3) is as follows:

the lightweight aggregate UHPC is prepared from the following components in parts by weight: 244 parts of the cement, 112 parts of the silica fume, 147 parts of the expanded perlite powder, and 244 parts of the expanded perlite, 146 parts of the water, 18 parts of the water-reducing agent, and 93 parts of the steel fiber; or the lightweight aggregate UHPC is prepared from the following components in parts by weight: 388 parts of the cement, 102 parts of the silica fume, 47 parts of the expanded perlite powder, and 223 parts of the expanded perlite, 137 parts of the water, 16 parts of the water-reducing agent, and 85 parts of the steel fiber.

8. A preparation method of the lightweight aggregate ultra-high performance concrete (UHPC) according to claim 1, comprising the following steps:

(1) conducting first mixing on the cement, the silica fume, the expanded perlite powder, and the expanded perlite to obtain a mixture;

(2) conducting second mixing on the mixture, the water-reducing agent, and the water to obtain mixed slurry;

(3) conducting third mixing on the mixed slurry and the steel fiber to obtain a blank; and
(4) conducting heat curing on the blank to obtain the lightweight UHPC.

9. The preparation method according to claim 8, wherein the heat curing comprises first-stage hot water curing and second-stage high-temperature dry curing that are conducted in sequence.

10. The preparation method according to claim 9, wherein the first-stage hot water curing comprises pre-curing, a heating stage, a constant-temperature stage, and a cooling stage that are conducted in sequence, wherein
a pre-curing temperature is 20-40° C. and a pre-curing time is 12-36 h in the first-stage hot water curing;
a heating rate in the heating stage of the first-stage hot water curing is 0.1-1° C./min;
a constant-temperature stage temperature is 90-100° C. and a constant-temperature stage time is 6-8 h in the constant-temperature stage of the first-stage hot water curing; and
a cooling rate in the cooling stage of the first-stage hot water curing is 0.23-0.3° C./min; and
the second-stage high-temperature dry curing comprises a heating stage, a constant-temperature stage, and a cooling stage that are conducted in sequence, wherein
a heating rate in the heating stage of the second-stage high-temperature dry curing is 5-10° C./min;
a constant-temperature time in the constant-temperature stage of the second-stage high-temperature dry curing is 2-3 h; and
a cooling rate in the cooling stage of the second-stage high-temperature dry curing is 0.1-0.5° C./min.

11. The lightweight aggregate UHPC according to claim 2, wherein a design method for determining a formula of the lightweight aggregate UHPC comprises the following steps:
(1) designing a first mix proportion of base groups with a dense structure based on a close packing theory by using a Modified Andreasen and Andersen model;
(2) establishing functional relationships between amounts of the expanded perlite powder and the expanded perlite for replacement and ultra-high performance, namely, density and strength, according to a response surface methodology, and determining mixing amounts of the expanded perlite powder and the expanded perlite according to a performance requirement; and
(3) testing and verifying a second mix proportion designed according to the response surface methodology of (2), to obtain a mix proportion of the lightweight aggregate UHPC.

12. The lightweight aggregate UHPC according to claim 3, wherein a design method for determining a formula of the lightweight aggregate UHPC comprises the following steps:
(1) designing a first mix proportion of base groups with a dense structure based on a close packing theory by using a Modified Andreasen and Andersen model;
(2) establishing functional relationships between amounts of the expanded perlite powder and the expanded perlite for replacement and ultra-high performance, namely, density and strength, according to a response surface methodology, and determining mixing amounts of the expanded perlite powder and the expanded perlite according to a performance requirement; and
(3) testing and verifying a second mix proportion designed according to the response surface methodology of (2), to obtain a mix proportion of the lightweight aggregate UHPC.

13. The lightweight aggregate UHPC according to claim 4, wherein
a design method for determining a formula of the lightweight aggregate UHPC comprises the following steps:
(1) designing a first mix proportion of base groups with a dense structure based on a close packing theory by using a Modified Andreasen and Andersen model;
(2) establishing functional relationships between amounts of the expanded perlite powder and the expanded perlite for replacement and ultra-high performance, namely, density and strength, according to a response surface methodology, and determining mixing amounts of the expanded perlite powder and the expanded perlite according to a performance requirement; and
(3) testing and verifying a second mix proportion designed according to the response surface methodology of (2), to obtain a mix proportion of the lightweight aggregate UHPC.

14. A preparation method of the lightweight aggregate ultra-high performance concrete (UHPC) according to claim 2, comprising the following steps:
(1) conducting first mixing on the cement, the silica fume, the expanded perlite powder, and the expanded perlite to obtain a mixture;
(2) conducting second mixing on the mixture, the water-reducing agent, and the water to obtain mixed slurry;
(3) conducting third mixing on the mixed slurry and the steel fiber to obtain a blank; and
(4) conducting heat curing on the blank to obtain the lightweight UHPC.

15. A preparation method of the lightweight aggregate ultra-high performance concrete (UHPC) according to claim 3, comprising the following steps:
(1) conducting first mixing on the cement, the silica fume, the expanded perlite powder, and the expanded perlite to obtain a mixture;
(2) conducting second mixing on the mixture, the water-reducing agent, and the water to obtain mixed slurry;
(3) conducting third mixing on the mixed slurry and the steel fiber to obtain a blank; and
(4) conducting heat curing on the blank to obtain the lightweight UHPC.

16. A preparation method of the lightweight aggregate ultra-high performance concrete (UHPC) according to claim 4, comprising the following steps:
(1) conducting first mixing on the cement, the silica fume, the expanded perlite powder, and the expanded perlite to obtain a mixture;
(2) conducting second mixing on the mixture, the water-reducing agent, and the water to obtain mixed slurry;
(3) conducting third mixing on the mixed slurry and the steel fiber to obtain a blank; and
(4) conducting heat curing on the blank to obtain the lightweight UHPC.

17. A preparation method of the lightweight aggregate ultra-high performance concrete (UHPC) according to claim 5, comprising the following steps:
(1) conducting first mixing on the cement, the silica fume, the expanded perlite powder, and the expanded perlite to obtain a mixture;
(2) conducting second mixing on the mixture, the water-reducing agent, and the water to obtain mixed slurry;
(3) conducting third mixing on the mixed slurry and the steel fiber to obtain a blank; and
(4) conducting heat curing on the blank to obtain the lightweight UHPC.

18. A preparation method of the lightweight aggregate ultra-high performance concrete (UHPC) according to claim 11, comprising the following steps:
   (1) conducting first mixing on the cement, the silica fume, the expanded perlite powder, and the expanded perlite to obtain a mixture;
   (2) conducting second mixing on the mixture, the water-reducing agent, and the water to obtain mixed slurry;
   (3) conducting third mixing on the mixed slurry and the steel fiber to obtain a blank; and
   (4) conducting heat curing on the blank to obtain the lightweight UHPC.

19. A preparation method of the lightweight aggregate ultra-high performance concrete (UHPC) according to claim 12, comprising the following steps:
   (1) conducting first mixing on the cement, the silica fume, the expanded perlite powder, and the expanded perlite to obtain a mixture;
   (2) conducting second mixing on the mixture, the water-reducing agent, and the water to obtain mixed slurry;
   (3) conducting third mixing on the mixed slurry and the steel fiber to obtain a blank; and
   (4) conducting heat curing on the blank to obtain the lightweight UHPC.

20. A preparation method of the lightweight aggregate ultra-high performance concrete (UHPC) according to claim 13, comprising the following steps:
   (1) conducting first mixing on the cement, the silica fume, the expanded perlite powder, and the expanded perlite to obtain a mixture;
   (2) conducting second mixing on the mixture, the water-reducing agent, and the water to obtain mixed slurry;
   (3) conducting third mixing on the mixed slurry and the steel fiber to obtain a blank; and
   (4) conducting heat curing on the blank to obtain the lightweight UHPC.

\* \* \* \* \*